United States Patent
Mattox et al.

(10) Patent No.: US 9,785,031 B2
(45) Date of Patent: Oct. 10, 2017

(54) CONDUCTIVE TRANSITION METAL OXIDE NANOSTRUCTURED ELECTROCHROMIC MATERIAL AND OPTICAL SWITCHING DEVICES CONSTRUCTED THEREOF

(71) Applicants: HELIOTROPE TECHNOLOGIES, INC., Berkeley, CA (US); THE REGENTS OF THE UNIVERSITY OF CALIFORNIA, Oakland, CA (US)

(72) Inventors: Tracy M. Mattox, Pleasanton, CA (US); Bonil Koo, Walnut Creek, CA (US); Guillermo Garcia, Oakland, CA (US); Delia J. Milliron, Oakland, CA (US); Luca De Trizio, Bergamo (IT); Clayton Dahlman, Berkeley, CA (US)

(73) Assignees: HELIOTROPE TECHNOLOGIES, INC., Alameda, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/671,061

(22) Filed: Mar. 27, 2015

(65) Prior Publication Data
US 2015/0277202 A1  Oct. 1, 2015

Related U.S. Application Data

(60) Provisional application No. 61/973,331, filed on Apr. 1, 2014.

(51) Int. Cl.
G02F 1/15 (2006.01)
G02F 1/153 (2006.01)

(52) U.S. Cl.
CPC ........ *G02F 1/1523* (2013.01); *G02F 2202/06* (2013.01); *G02F 2202/36* (2013.01); *G02F 2203/10* (2013.01)

(58) Field of Classification Search
USPC ........ 359/237, 245–247, 265–267, 275, 315, 359/321, 290–292, 295, 296, 298
See application file for complete search history.

(56) References Cited

U.S. PATENT DOCUMENTS

| 4,150,879 A | 4/1979 | Bayard |
| 4,325,611 A | 4/1982 | Huggins et al. |

(Continued)

FOREIGN PATENT DOCUMENTS

| WO | WO 03/014254 A1 | 2/2003 |

OTHER PUBLICATIONS

Adachi, K. et al., "Chromatic Instabilities in Cesium-Doped Tungsten Bronze Nanoparticles," Journal of Applied Physics, vol. 114, pp. 194304-1 to 194304-11, (2013).

(Continued)

*Primary Examiner* — Brandi Thomas
(74) *Attorney, Agent, or Firm* — The Marbury Law Group PLLC

(57) ABSTRACT

An electrochromic device includes a nanostructured transition metal oxide bronze layer that includes one or more transition metal oxide and one or more dopant, a solid state electrolyte, and a counter electrode. The nanostructured transition metal oxide bronze selectively modulates transmittance of near-infrared (NIR) spectrum and visible spectrum radiation as a function of an applied voltage to the device.

20 Claims, 18 Drawing Sheets

(56) References Cited

U.S. PATENT DOCUMENTS

| | | | |
|---|---|---|---|
| 4,902,110 A | 2/1990 | Green | |
| 6,185,034 B1* | 2/2001 | Nakamura | G02F 1/1533 359/265 |
| 8,470,212 B2 | 6/2013 | Tofuku | |
| 2004/0106041 A1* | 6/2004 | Reynolds | H01M 4/60 429/213 |
| 2007/0076286 A1 | 4/2007 | Sung et al. | |
| 2007/0187653 A1* | 8/2007 | Takeda | B82Y 30/00 252/500 |
| 2012/0200908 A1 | 8/2012 | Bergh et al. | |
| 2013/0107345 A1 | 5/2013 | Kailasam et al. | |
| 2013/0182307 A1 | 7/2013 | Gillaspie et al. | |
| 2013/0286458 A1* | 10/2013 | Lamine | G02F 1/155 359/265 |

OTHER PUBLICATIONS

Moon, K. et al., "Near Infrared Shielding Properties of Quaternary Tungsten Bronze Nanoparticle Na0.11Cs0.22WO3," Bull. Korean Chem. Soc. 2013, vol. 34, No. 3, pp. 731-734, (2013).

Chen, C. J. et al,, "Preparation and Near-Infrared Photothermal Conversion Property of Cesium Tungsten Oxide Nanoparticles," Nanoscale Research Letters 2013, vol. 8, No. 57, pp. 2-8, (2013).

Milliron, D. et al., "Electrochromism of Nanostructured Films of Transparent Conducting Oxides," Molecular Foundry, IME-9, Berkley Lab, Bordeaux, 16 pages, (2010).

Adachi, K. et al., "Activation of Plasmons and Polarons in Solar Control Cesium Tungsten Bronze and Reduced Tungsten Oxide Nanoparticles," J. Mater. Res., vol. 27, No. 6, pp. 965-970, (2012).

Llordes, A. et al., "Tunable Near-Infrared and Visible-Light Transmittance in Nanocrystal-in-Glass Composites," Letter, Nature, vol. 500, pp. 323-327, (2013).

Shang, D. S. et al., "Visualization of the Conductive Channel in a Planar Resistance Switching Device Based on Electrochromic Materials," Journal of Applied Physics 111, pp. 053504-1 to 053504-7, (2012).

Transmittal of International Preliminary Report on Patentability and Written Opinion of the International Searching Authority for International Application No. PCT/US2015/022980, dated Oct. 13, 2016, 9 pages.

International Search Report and Written Opinion for PCT/US2015/022980 dated Jun. 30, 2015 (12 pages).

Heusing, S., "A contribution to climate protection—Electrochemic windows fabricated with the Sol-gel technology," Annual Report Jahresbericht of Leibniz Institut fr Neue Materialien Ein Institut der Leibniz-Gemeinsc faft, pp. 90-99, (2011).

European Office Communication, Extended European Search Report for European Patent Application No. 15774402.0 PCT/US2015/022980), dated Jul. 26, 2017, 8 pages.

\* cited by examiner

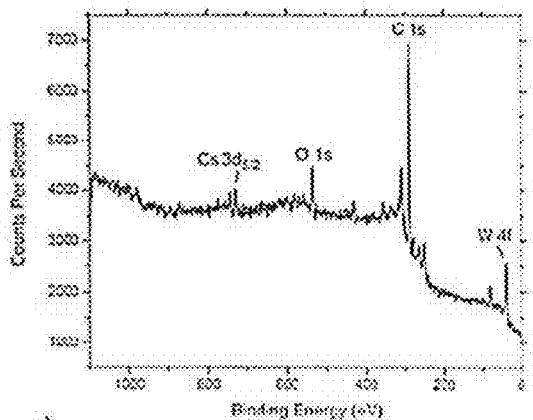
FIG. 3H
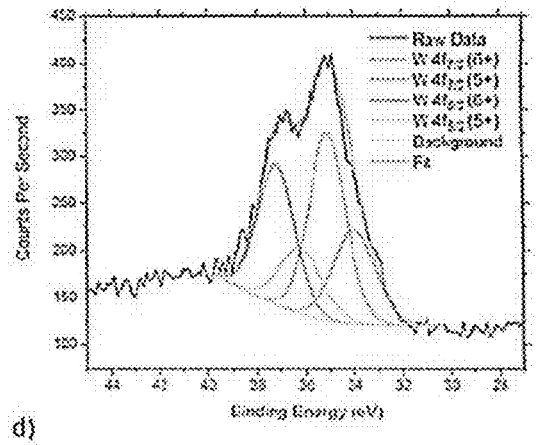
FIG. 3I
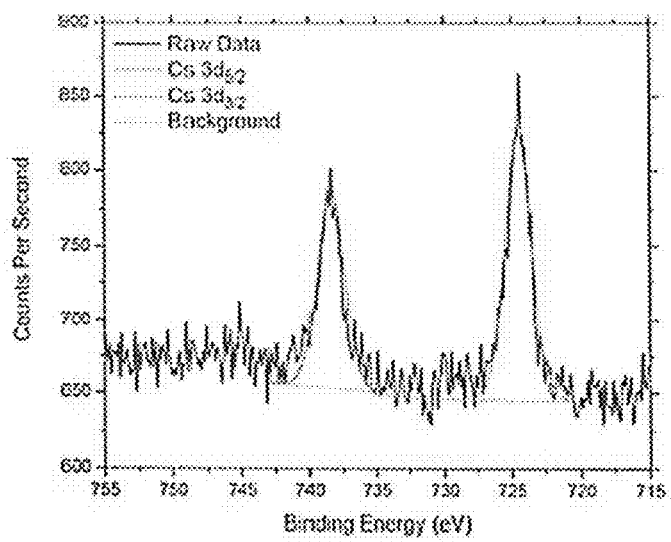
FIG. 3J
| Peak | Area | RSF | Composition (at %) |
|---|---|---|---|
| Cs 3d$_{5/2}$ | 450 | 7.041 | 18.2% |
| W 4f | 1030 | 3.523 | 81.7% |
FIG. 3K

CONDUCTIVE TRANSITION METAL OXIDE NANOSTRUCTURED ELECTROCHROMIC MATERIAL AND OPTICAL SWITCHING DEVICES CONSTRUCTED THEREOF

RELATED APPLICATION

The present application is related to and claims priority to U.S. Provisional Application No. 61/973,331, filed Apr. 1, 2014, the entire contents of which are incorporated by reference herein.

STATEMENT OF GOVERNMENT SUPPORT

This invention was made with government support under Contract No. DE-AC02-05CH11231 awarded by the U.S. Department of Energy. The government has certain rights in this invention.

FIELD

The present invention is generally directed to electrochromic devices, and more particularly to the selectively modulating transmittance of radiation as a function of voltage applied to a nanostructured material in an electrochromic device.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured lat relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Traditional EC materials, such as $WO_3$, $Nb_2O_5$, and NiO, primarily modulate visible light (400-780 nm), while the near-infrared (NIR) region of light (780-2500 nm) remains either unchanged or switches simultaneously with visible region of light.

SUMMARY OF THE INVENTION

An embodiment electrochromic device includes at least one transparent conductor layer, a nanostructured transition metal oxide bronze layer including one or more transition metal oxide and one or more dopant, a solid state electrolyte, and a counter electrode. In an embodiment of the invention, the nanostructured transition metal oxide bronze indepen- dently, selectively modulates transmittance of near-infrared (NIR) spectrum and visible spectrum radiation as a function of an applied voltage to the device.

In an embodiment method of operating an electrochromic device that has at least one transparent conductor layer, a nanostructured transition metal oxide bronze layer with one or more transition metal oxide and one or more dopant, a solid state electrolyte, and a counter electrode includes applying a first voltage to the device such that the nano- structured transition metal oxide bronze selectively modu- lates transmittance of near-infrared (NIR) spectrum radia- tion, and applying a second voltage having a larger absolute value than the first voltage to the device such that the nano structured transition metal oxide bronze selectively modu- lates transmittance visible spectrum radiation.

BRIEF DESCRIPTION OF THE DRAWINGS

FIG. 3H is a graph showing results of an x-ray photo- electron spectroscopy (XPS) survey scan for samples of the embodiments.

FIGS. 3I and 3J are high resolution scans of tungsten $4f_{7/2}$ and $4f_{5/2}$ peaks and cesium $3d_{5/2}$ and $3d_{3/2}$ peaks.

FIG. 3K is a table showing peak fit parameters and compositions for compositions of the embodiments.

DETAILED DESCRIPTION OF THE EMBODIMENTS

An embodiment of the invention provides a single-component electrochromic nanostructured material capable of selectively modulating near-infrared (NIR) and visible spectral regions. The material may consist of a nanostructured doped transition metal oxides with ternary compounds of the type $A_xM_zO_y$. In various embodiment $A_xM_zO_y$ compounds, if it is assumed that z=1, then $0.08 \leq x \leq 0.5$ (preferably $0.25 \leq x \leq 0.35$), and $2 \leq y \leq 3$. In various embodiments, since the nanostructures may be non-uniform as a function of depth, x may represent an average doping content. To operate, the subject material will be fabricated into an electrode that will change optical properties after driven by an applied voltage.

In order to improve the performance of EC window coatings, selective modulation of both NIR spectrum and visible spectrum radiation is desired. Various embodiments provide a single-component electrochromic nanostructured material capable of selectively modulating near-infrared (NIR) and visible spectral regions.

The various embodiments provide devices and methods for enhancing optical changes in windows using a single component, electrochromic nanostructured material fabricated into an electrode to form an electrochromic device. In various embodiments, the material may undergo a reversible change in optical properties when driven by an applied potential. Based on the applied potential, the materials may modulate NIR spectrum radiation (wavelength of 780-2500 nm), as well as visible spectrum radiation (wavelength of 400-780 nm). In an example, the material may operate in multiple selective modes based on the applied potential. Control of the individual operating modes may occur at different applied bias, allowing users the capability of achieving thermal management within buildings and other enclosures (e.g., vehicles, etc.), while still providing shading when desired.

Figure 7:
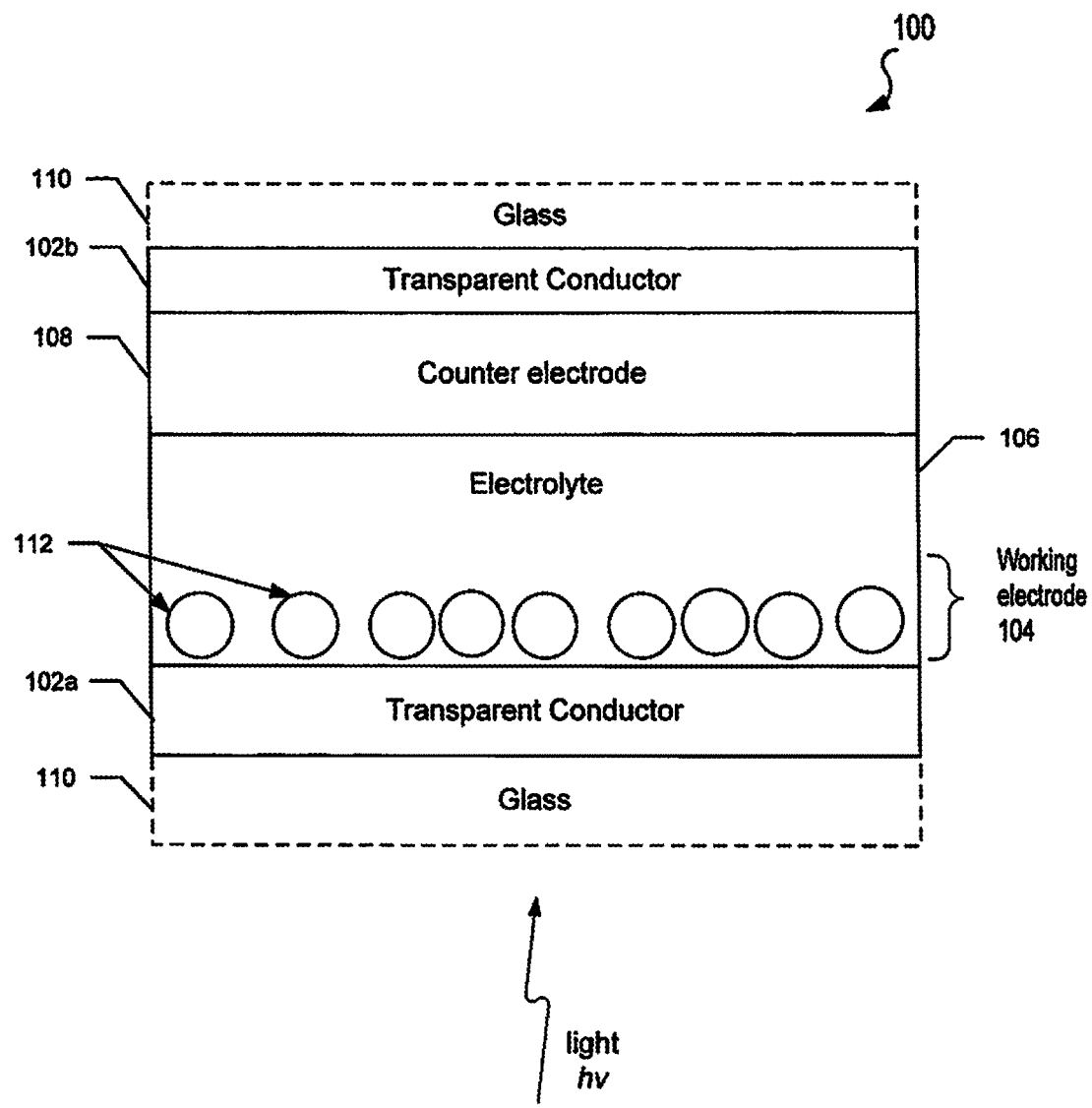
FIG. 7 is a schematic representation of an electrochromic device according to various embodiments.

FIG. 7 illustrates an embodiment electrochromic device. The device 100 may include a first transparent conductor layer 102a, a working electrode 104, a solid state electrolyte 106, a counter electrode 108, and a second transparent conductor layer 102b. Some embodiment electrochromic devices, may also include one or more optically transparent support layer, such as plastic or glass layer 110 positioned in front of the first transparent conductor layer 102a and/or positioned behind the second transparent conductor layer 102b.

It should be noted that the electrochromic device 100 may be oriented upside down or sideways from the orientation illustrated in FIG. 1. Furthermore, the thickness of the layers and/or size of the components of the device 100 are not drawn to scale or in actual proportion to one another other, but rather are shown as representations.

The first and second transparent conductor layers 102a, 102b may be formed from transparent conducting films fabricated using inorganic and/or organic materials. For example, the transparent conductor layers 102a, 102b may include inorganic films of transparent conducting oxide (TCO) materials, such as indium tin oxide (ITO) or fluorine doped tin oxide (FTO). In other examples, organic films in transparent conductor layers 102a, 102b may include graphene and/or various polymers.

In the various embodiments, the working electrode 104 may include nanostructures 112 of a doped transition metal oxide bronze. As discussed above, the thickness of the layers of the device 100, including and the shape, size and scale of nanostructures is not drawn to scale or in actual proportion to each other, but is represented for clarity. In the various embodiments, nanostructures 112 may be embedded in an optically transparent matrix material or provided as a packed or loose layer of nanostructures exposed to the electrolyte.

In the various embodiments, the doped transition metal oxide bronze of the nanostructures 112 may be a ternary composition of the type $A_xM_zO_y$, where M represents a transition metal ion species in at least one transition metal oxide, and A represents at least one dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, and titanium oxide. In one example, the nanostructured transition metal oxide bronze may include a plurality of tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorbance of NIR spectrum radiation, the specific amount and wavelengths for which may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 106 and the nanostructured transition metal oxide bronze of the working electrode 104 as a result of the applied voltage. Specifically, the application of voltage within the particular range may cause the second dopant species to intercalate and deintercalate the transition metal oxide structure. In this manner, the second dopant may cause a change in the oxidation state of the transition metal oxide, which may cause a polaron effect and a shift in the lattice structure of the transition metal oxide. This shift may cause absorption of both visible and NIR spectrum radiation.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

Based on these optical effects, the nanostructures 112 of the working electrode may progressively modulate transmittance of NIR and visible light as a function of applied voltage by operating in at least three different modes. For example, a first mode may be a highly solar transparent ("bright") mode in which the working electrode 104 is transparent to NIR spectrum and visible spectrum radiation. A second mode may be selective-NIR blocking ("cool") mode in which the working electrode 104 is transparent to visible spectrum radiation but absorbs NIR spectrum radiation. A third mode may be a visible blocking ("dark") mode in which the working electrode 104 absorbs both visible spectrum and at least some of NIR spectrum radiation. In an example, application of a first voltage having a negative bias may cause the electrochromic device to operate in the cool state, blocking transmittance of NIR spectrum radiation. In another example, application of a second negative bias voltage having a higher absolute value than the first voltage may cause the electrochromic device to operate in the dark state, blocking transmittance of visible spectrum and NIR spectrum radiation. In another example, application of a third voltage having a positive bias may cause the electrochromic device to operate in the bright state, allowing transmittance of both NIR spectrum and visible spectrum radiation. In various embodiments, the applied voltage may be between −5V and 5V, preferably between −2V and 2V. For example, the first voltage may be −0.25V to −0.75V, and the second voltage may be −1V to −2V. In another example, the absorption of radiation at a wavelength of 800-1500 nm by the electrochromic device may be at least 50% greater than its absorption of radiation at a wavelength of 450-600 nm.

In various embodiments, the solid state electrolyte 106 may include at least a polymer material and a plasticizer material, such that electrolyte may permeate into crevices between the nanoparticles 112 of the nanostructured transition metal oxide bronze material. In some embodiments, the solid state electrolyte 106 may further include a salt, for example, a lithium salt. In some embodiments, the solid state electrolyte 106 may initially contain a solvent, such as butanol, which may be evaporated off once the electrochromic device is assembled. In some embodiments, the solid state electrolyte 106 may be around 40-60 wt % plasticizer material, preferably around 50-55 wt % plasticizer material. In an embodiment, the plasticizer material may include at least one of tetraglyme and an alkyl hydroperoxide. In an embodiment, the polymer material of the solid state electrolyte 106 may be polyvinylbutyral (PVB), and the salt may be lithium bis(trifluoromethane). In other embodiments, the solid state electrolyte 106 may include at least one of lithium phosphorus oxynitride (LiPON) and tantalum pentoxide ($Ta_2O_5$).

The counter electrode 108 of the various embodiments should be capable of storing enough charge to sufficiently balance the charge needed to cause visible tinting to the nanostructured transition metal oxide bronze working electrode 104. In various embodiments, the counter electrode 108 may be formed as a conventional, single component film, a nanostructured film, or a nanocomposite layer.

In some embodiments, the counter electrode 108 may be formed from at least one passive material that is optically transparent to both visible spectrum and NIR spectrum radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, or $V_2O_5$. In other embodiments the counter electrode 108 may be formed from at least one complementary material, which may be transparent to NIR spectrum radiation but which may be oxidized in response to application of a bias, thereby causing absorption of visible spectrum radiation. Examples of such complementary counter electrode materials may include $Cr_2O3$, $MnO_2$, $FeO_2$, $CoO_2$, $NiO_2$, $RhO_2$, or $IrO_2$.

Without being bound to any particular theory, it is believed that the application of a first voltage in the various embodiments may cause the interstitial dopant species (e.g., cesium) in the crystal structure of the transition metal oxide bronze to have a greater amount of free carrier electrons and/or to cause the interstitial dopant species (e.g., lithium ions from the electrolyte) to perform non-faradaic capacitive or pseudo-capacitive charge transfer on the surface of the nanostructures 112, which may cause the surface plasmon resonance effect to increase the absorption of near-infrared radiation. In this manner, the absorption properties of the transition metal oxide bronze characteristics may change (i.e., increased absorption of near-infrared spectrum radiation) upon application of the first voltage. Further, application of a second voltage having a higher absolute value than the first voltage in the various embodiments may cause faradaic intercalation of an intercalation dopant species (e.g., lithium ions) from the electrolyte into the transition metal oxide nanostructures. It is believed that the interaction of this dopant species provides interstitial dopant atoms in the lattice which creates a polaron effect. In this manner, the lattice structure of transition metal oxide nanocrystals may experience a polaron type shift, thereby altering its absorption characteristics (i.e., shift to visible spectrum radiation absorption) to block both visible and near infrared radiation.

Compared to nanocomposite electrochromic films, the various embodiments may involve similar production by utilizing a single nanostructured material in the working electrode to achieve the desired spectral control in both near-infrared spectrum and visible spectrum ranges.

The nanostructured transition metal oxide bronzes that may be used to form the working electrode 104 of embodiment electrochromic devices maybe formed using any of a number of low cost solution process methodologies. For example, solutions of Nb:$TiO_2$ and $Cs_xWO_3$ may be synthesized using colloidal techniques. Compared to other synthetic methodologies, colloidal synthesis may offer a large amount of control over the nanostructure size, shape, and composition of the nanostructured transition metal oxide bronze. After deposition, a nanostructured transition metal oxide bronze material in the working electrode 104 may be subjected to a thermal post treatment in air to remove and cap ligands on the surface of the nanostructures.

Electrochromic responses of prepared nano structured transition metal oxide bronze materials (e.g., $Cs_xWO_3$, Nb:$TiO_2$, etc.) may be demonstrated by spectroelectrochemical measurements.

In various embodiments, the shape, size, and doping levels of nanostructured transition metal oxide bronzes may be tuned to further contribute to the spectral response by the device. For instance, the use of rod versus spherical nanostructures 112 may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 112 that form the working electrode 104. For example, the nanostructures may be nanoparticles of various shapes, sizes and/or other characteristics that may influence the absorbance of NIR spectrum and/or visible spectrum radiation. In some embodiments, the nanostructures 112 may be isohedrons that have multiple facets, preferably at least 20 facets.

The following examples, experimental methods and results are not intended to limit the scope of the invention, but rather are provided merely for illustration of how nanoparticle characteristics may be utilized to further tune their electrochromic properties.

Localized surface plasmon resonance phenomena have recently been investigated in unconventional plasmonic materials such as metal oxide and chalcogenide semiconductors doped with high concentrations of free carriers. Colloidal nanocrystals of $Cs_xWO_3$ a tungsten bronze in which electronic charge carriers are introduced by interstitial doping, were synthesized. By using varying ratios of oleylamine to oleic acid three distinct shapes of these nanocrystals may be formed; hexagonal prisms, truncated cubes, and pseudo-spheres, which may exhibit strongly shape-dependent absorption features in the near infrared region. As shown in results, lower symmetry shapes may correlate with sharper plasmon resonance features and more distinct resonance peaks. The plasmon peak positions may also shift systematically with size and with the dielectric constant of the surrounding media, reminiscent of typical properties of plasmonic metal nanoparticles.

Controlling the size and geometry of metal nanocrystal surfaces may make it possible to tailor these particles to achieve diverse surface plasmon resonance (SPR) properties, allowing select nanoparticles to be tuned for use in sensors, electronic circuits, and photonic devices. The influence of particle geometry and size on optical properties is documented for many different metal nanoparticle shapes, including cubes, octahedra, rods, and stars. Semiconductor nanocrystals may offer similar synthetic control over size and geometry. The shape of such nanocrystals dramatically influences their near infrared (NIR) optical spectra. Changing the shape of a metallic particle alters the surface polarization, which influences how the surface interacts with light and thus the SPR. Particle size also has an effect on the optical properties of these materials, which is often described using Mie's solution to Maxwell's equation or the discrete dipole approximation.

Though exact solutions only exist for spheres, spheroids, and infinite cylinders, changing the nanoparticle size of a wide variety of shapes is known to influence the SPR. For example, increasing the aspect ratio in nanorods may cause the plasmon peak to red-shift in samples of gold as well as tungsten oxide. Increasing the size of silver triangles and plates may also result in a red-shift of the SPR.

Until recently, semiconductor nanocrystals had low free carrier concentrations and did not exhibit SPR phenomena. In metal oxide nanocrystals, substitutional doping with heterovalent metal ions has recently been used to introduce large free electron populations that support SPR in the infrared region. For example, this phenomenon has recently been demonstrated in tin-doped indium oxide, aluminum-doped zinc oxide, indium-doped cadmium oxide, and niobium-doped anatase titania. In copper chalcogenide nanocrystals large populations of free holes are generated by inducing copper deficiencies, which yields similar infrared plasmon absorption features. However, these defect-doping strategies are limited with respect to the achievable carrier concentrations and therefore the spectral tuning range of the SPR.

Tungsten oxide of the formula $WO_{3-x}(x<0.33)$ is a reduced form of tungsten trioxide ($WO_3$) that is widely understood to contain oxygen vacancies within the crystal lattice. These oxygen vacancies create changes in the charge states of tungsten, which influence absorption properties and can give rise to infrared SPR phenomena. However, the crystal structure of $WO_3$ may offer additional opportunity for introducing free electrons beyond the concentrations typically achievable by defect mechanisms. Unlike substitutional doping, in which a doping atom replaces an atom within the crystal lattice, interstitial doping allows a new atom to be incorporated within the crystal structure as a result of atomic vacancies or defects within the lattice. As a result, it is possible for the nanocrystal to have a higher concentration of free electrons. The crystal structures of $WO_3$ and $WO_{3-x}$, are composed of $WO_6$ octahedra as the basic structural unit, creating one-dimensional tunnels of variable sizes and shapes. These tunnels are highly selective for cations with ionic radii of 1.2 and 1.7 Å, so they are ideal for the incorporation of cesium atoms with ionic radii of 1.69 Å. Such cesium-doped tungsten oxides are known to have exceptionally strong NIR spectrum radiation absorption because the cesium may act as an interstitial dopant, introducing a far higher population of free electrons than is achievable using lattice-site defects including heterovalent metals or vacancies.

A class of interstitially doped tungsten oxides known as tungsten bronze has the formula $M_xWO_3$, where M may be, without limitation, $Li^+$, $Na^+$, $Cs^+$, or $Rb^+$. Tungsten bronze materials retain a high transmittance of visible light while exhibiting high absorption of NIR spectrum radiation, making them ideal candidates for spectrally-selective optical devices, such as electrochromic smart windows. Various methods have been used to synthesize $M_xWO_3$, such as solid-state synthesis, thermal plasma synthesis, and chemical transport. Various embodiment methods may involve colloidal synthesis of tungsten bronze, which may show how shape evolution from pseudo-spheres to truncated cubes to hexagonal prisms of the same $Cs_xWO_3$ crystal structure influences the SPR.

Figure 1A:
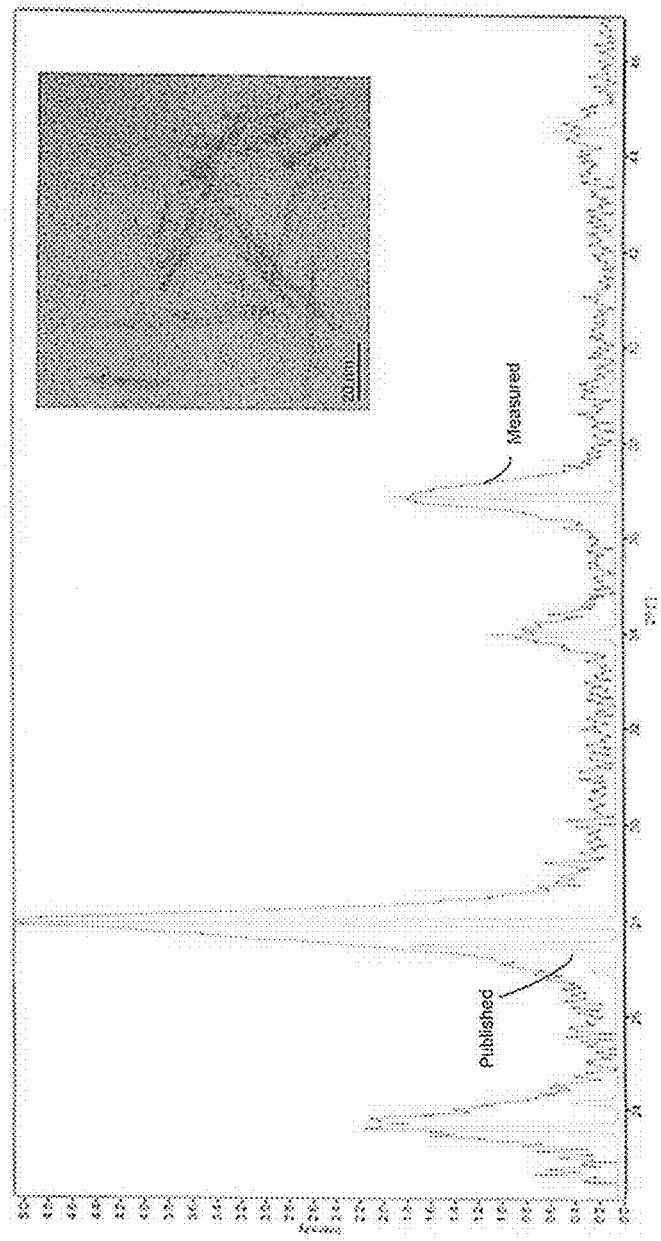
FIG. 1A is a graph showing measured and published x-ray diffraction patterns for $Rb_{0.29}WO_3$ with an inset transmis- sion electron microscopy (TEM) image of synthesized nanocrystals.
Figure 1B:
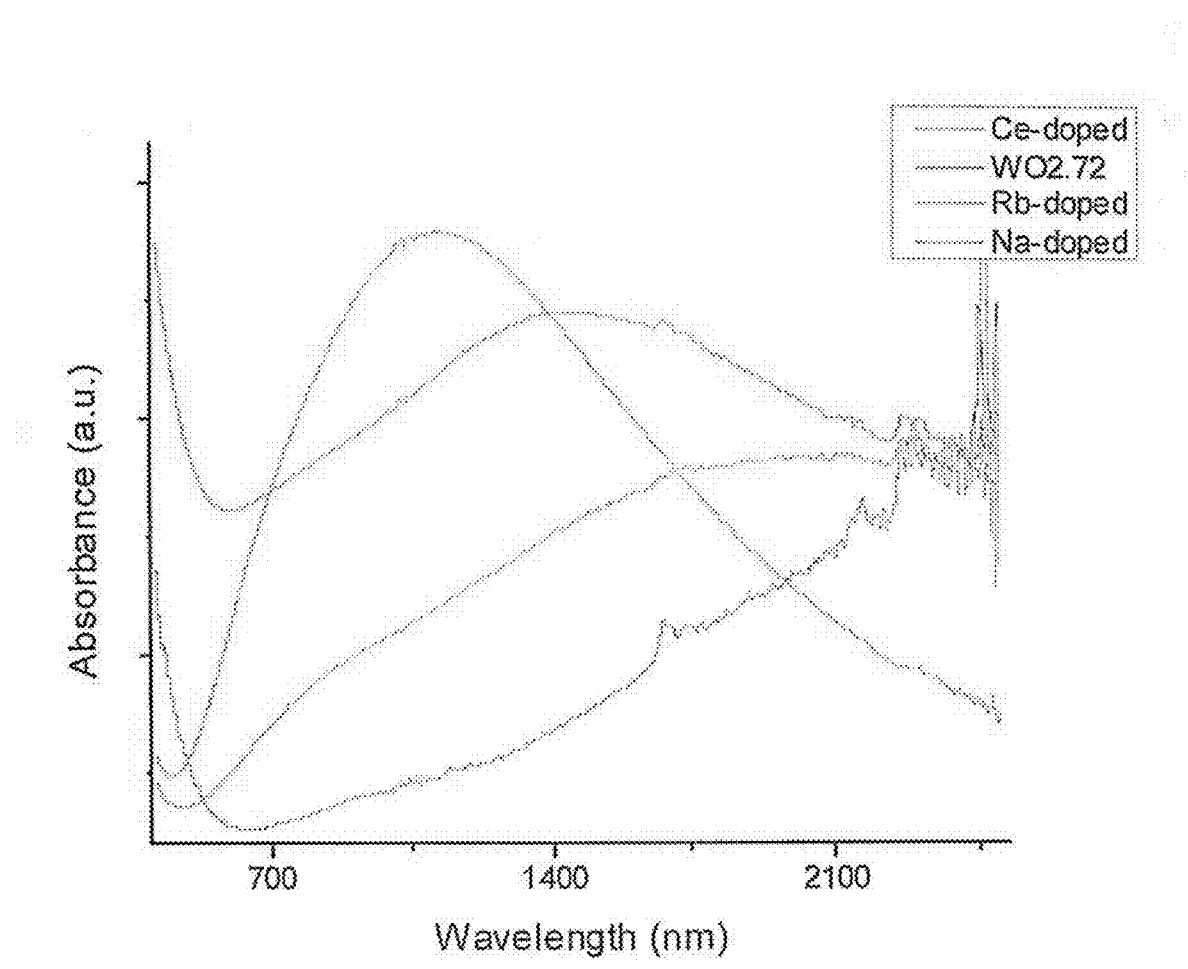
FIG. 1B is a graph showing absorbance spectra of various doped $WO_{2.72}$ compositions.

X-ray diffraction (XRD) confirms that these synthetic procedures may be translated to synthesize $Rb_xWO_3$. As shown in FIGS. 1A and 1B, using cerium and sodium as dopants may also influence the NIR optical spectra. FIG. 1A illustrates a comparison between measured XRD pattern data for rubidium doped tungsten oxide ($Rb_{0.29}WO_3$) nanocrystals that were synthesized and XRD pattern data published in the Inorganic Crystal Structure Database (ICSD) as ICSD: 1716. FIG. 1A also includes an inset transmission electron microscopy (TEM) image of the synthesized $Rb_{0.29}WO_3$ nanocrystals. FIG. 1B shows the absorbance spectra of a tungsten oxide material ($WO_{2.72}$), the structure of which is based on XRD pattern data, and of the tungsten oxide material doped with rubidium, sodium, and cerium.

The preferred incorporation of ions, the size of cesium and the exceptional NIR spectrum radiation absorption of tungsten oxide doped with cesium, indicate that $Cs_xWO_3$ may be a preferred tungsten bronze. The following procedures describe methods for creating $Cs_xWO_3$ and analyzing its geometry, size, and dielectric environment for systematically manipulating optical properties Synthesis of $Cs_xWO_3$ In a 50 mL three neck flask equipped with an air-cooled condenser, under nitrogen flow, 0.20 mmol (66 mg) tungsten (IV) chloride ($WCl_4$) (Strem Chemical), 0.12 mmol (20 mg) cesium chloride (CsCl) (Aldrich), 0.60 mmol (0.20 mL) oleylamine (OlAm) (Aldrich), and 19.0 mmol (5.2 mL) oleic acid (OlAc) (Sigma-Aldrich) were stirred at 300° C. for 120 minutes and resulted in a blue-green solution. The reaction was cooled to room temperature and 0.5 mL toluene (Aldrich) was added to the blue-green solution. A 1:1 ratio of acetone to reaction mixture precipitated the product and the mixture was centrifuged at 3800 rpm for ten minutes. The blue-green precipitate was redispersed in 0.5 mL toluene and precipitated again with 1 mL acetone (BDH). Centrifuging for an additional ten minutes at 3800 rpm resulted in clean nanocrystals of $Cs_xWO_3$. The reaction yields a qualitatively similar product over a range of CsCl (0.05-0.18 mmol) while varying the amounts of OlAm and OlAc results in three different nanocrystalline shapes (pseudo-spheres, 1.5 mmol OlAm and 3.1-7.9 mmol OlAc; truncated cubes, 0.50-1.0 mmol OlAm and 19.0 mmol OlAc; hexagonal prisms, 0.60-1.5 mmol OlAm and 19.0-31.7 mmol OlAc).

Synthesis of $WO_{2.72}$

In a 50 mL, three-neck flask equipped with an air-cooled condenser, under nitrogen flow, 0.20 mmol (66 mg) $WCl_4$, 19 mmol (1.2 mL) OlAm, and 1.5 mmol (3.5 mL) OlAc were stirred at 300° C. for 120 minutes. The product was precipitated with 12 mL acetone and centrifuged for 15 minutes at 3800 rpm. The blue pellet was redispersed in 0.5 mL toluene and precipitated once more with 2 mL acetone. Centrifuging for 20 minutes at 3800 rpm resulted in a clean, dark blue product with nanorod Morphology.

Results

XRD patterns were collected on a Broker D8-Discover X-ray diffractometer equipped with a GADDS area detector and operated at 40 kV and 20 mA at the wavelength of Cu $K_\alpha$ 1.54 Å. Optical spectra were collected on an ASD LabSpec Pro and high resolution TEM images were collected on a JEOL 2100 operated at an accelerating voltage of 200 kV. XRD modeling was performed using diffraction data for $Cs_{0x}WO_3$ ($P6_322$ space group) in CrystalMaker and Le Bail refinement was performed using the Generalized Structure Analysis System (GSAS). X-ray Photoelectron Spectroscopy (XPS) measurements were performed using a Physical Electronics PHI 5400 equipped with an aluminum x-ray source. All XPS spectra were calibrated to the C1s peak at 284.8 eV in order to correct for possible charging and high resolution spectra of the Cs $3d_{5/2}$ and W 4f peaks were analyzed using the CasaXPS software package. Elemental analysis using Flame Atomic Absorption (FLAA) and Inductively Coupled Plasma Optical Emission Spectrometry (ICP-OES) was performed by Galbraith Laboratories, Incorporated. Optical spectra were collected in tetrachloroethylene (TCE) (Sigma-Aldrich).

To evaluate the shape of the resulting nanocrystals, samples were surveyed by low-resolution TEM.

Figure 1C:
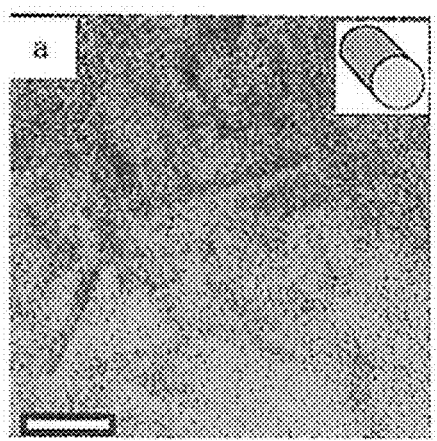
FIGS. 1C-1F are TEM images of different shapes of nanostructures for $WO_{2.72}$ and/or $Cs_{0.29}WO_3$ samples.
Figure 1D:
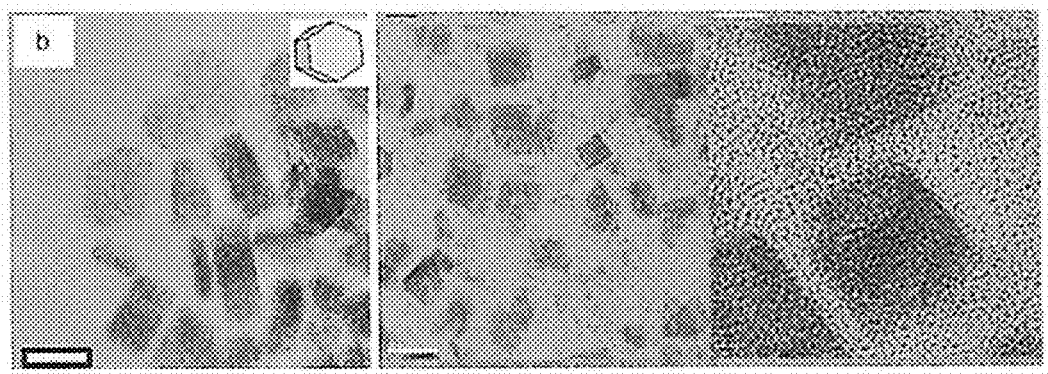
Figure 1E:
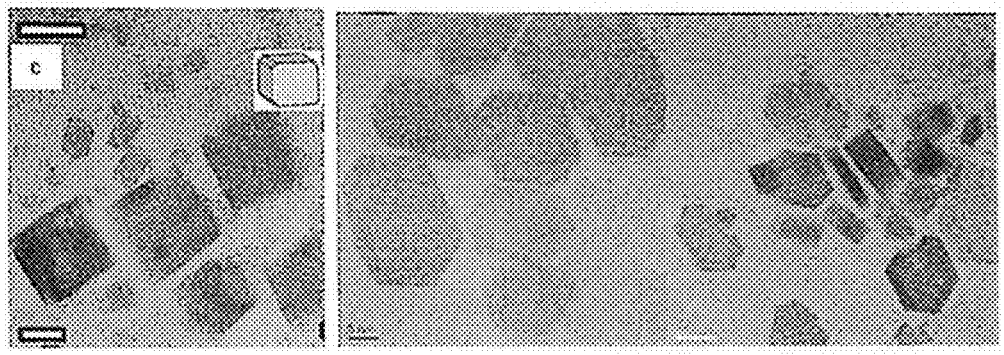
Figure 1F:
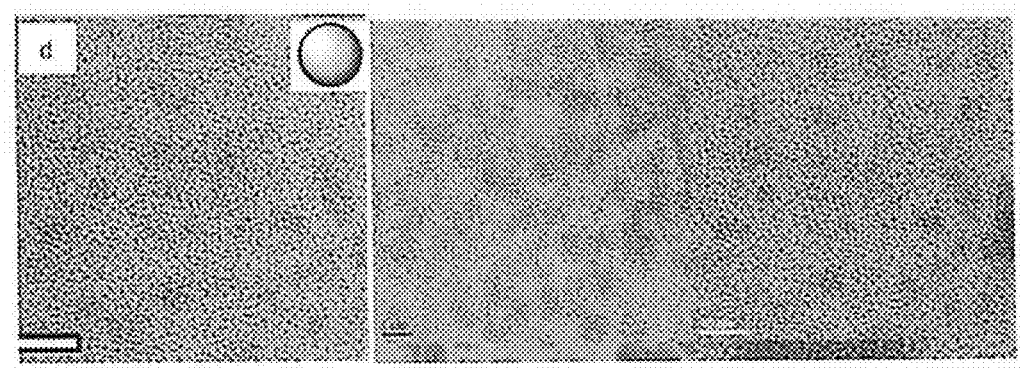

FIG. 1C is a TEM image of $WO_{2.72}$ nanorods that were produced absent any cesium doping, with an inset illustrated rod shape. It has been previously observed in $CeO_2$ and $Re_2O_3$ that changing the ratio of OlAc to OlAm provides shape control as a result of different binding capabilities of the ligands and passivation into the surface of the nanocrystal. Similarly, when cesium was incorporated, increasing the amount of OlAc produces more faceted shapes. As shown in FIGS. 1D-1F, different shapes were achieved depending on the ratio of OlAc to OlAm. Specifically, FIGS. 1D-1F are TEM images of $Cs_xWO_3$ hexagonal prisms, cubes and pseudo-spheres, respectively, each with a corresponding inset illustrated shape. Hexagonal prisms result when the OlAc:OlAm ratio is 12.5-31, truncated cubes when the ratio is 5.2-12.5, and pseudo-spheres when the ratio is 2.1-5.2.

Figure 1G:
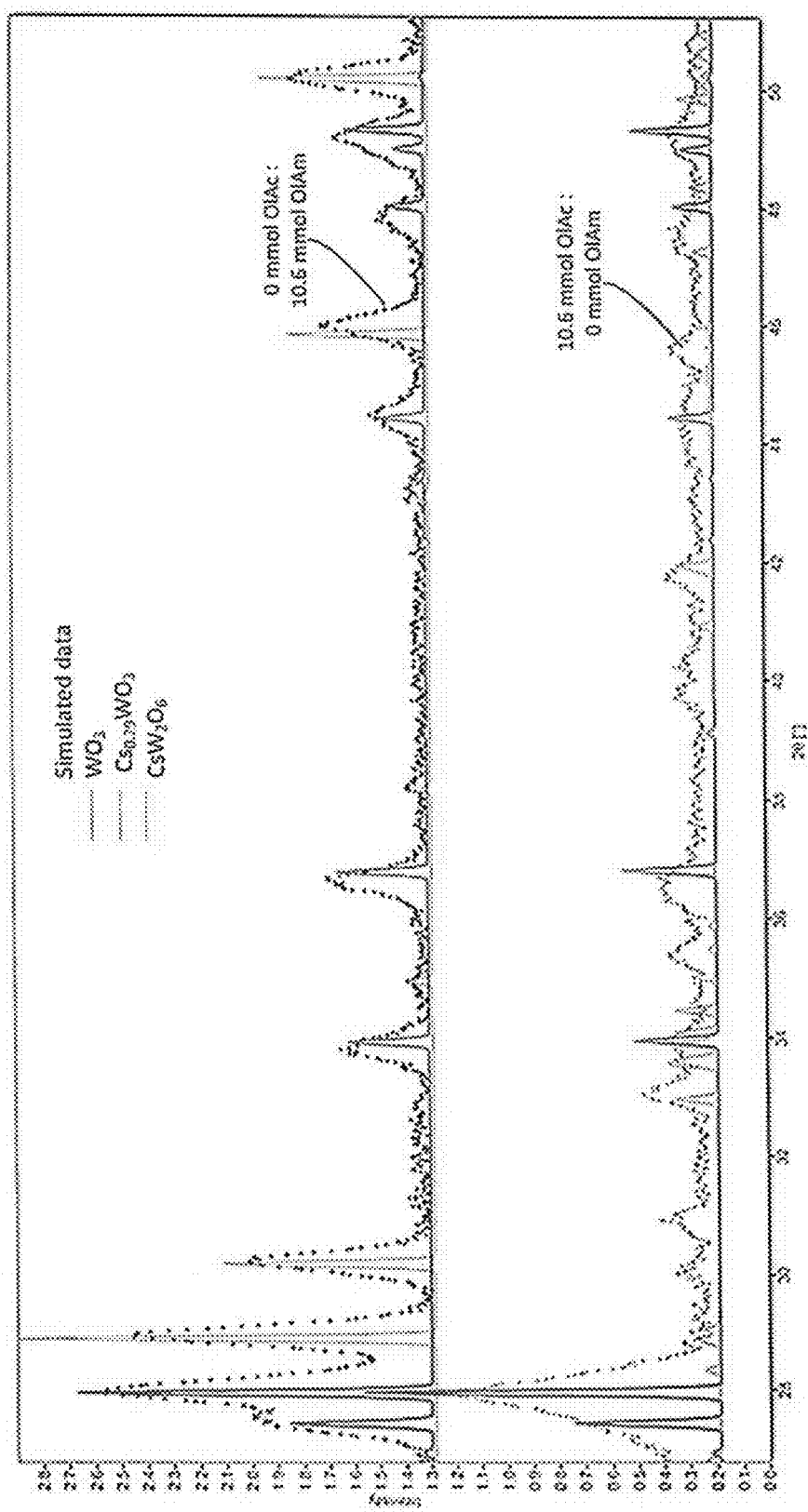
FIG. 1G is a graph showing x-ray diffraction patterns for various synthesized samples and simulated compounds.
Figures 1H, 1I:
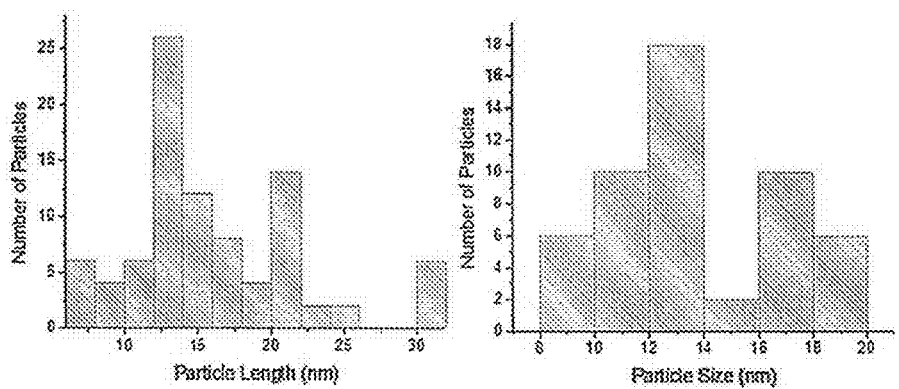
FIGS. 1H-1K are size histograms from bright field TEM images including 50-100 particles each of different shapes for various samples.
Figures 1J, 1K:
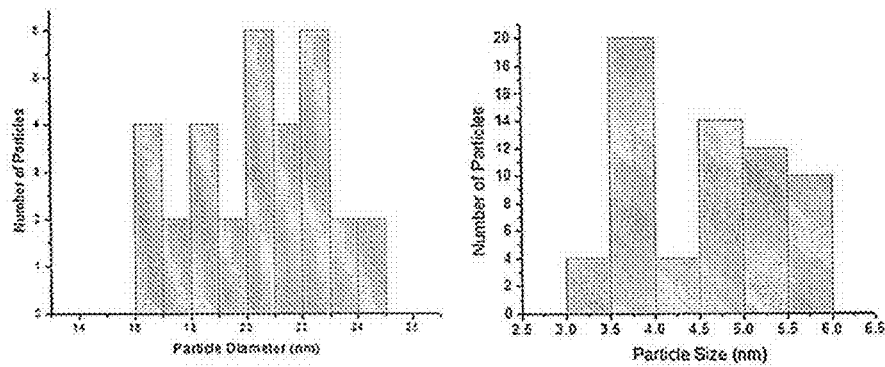

FIG. 1G illustrates XRD patterns for samples synthesized using 0 mmol OlAc: 10.6 mmol OlAm and 10.6 mmol OlAc:0 mmol OlAm with simulated data for $Cs_{0.29}WO_3$ (ICSD: 56223), $CsW_2O_6[Cs_{0.5}WO_3]$ (ICSD: 72634.), and $WO_3$(ICSD: 32001), which are not phase pure at these extremes of the surfactant composition. As shown by the data, an OlAc:OlAm ratio of less than 2.1 or greater than 31.3 results in mixed crystalline phases by XRD.

Particle sizes were determined by TEM to be 16.0±5.8 nm for the undoped $WO_{2.72}$ rods (measuring the long dimension), 4.6±0.79 nm for the $Cs_xWO_3$ pseudo-spheres, 20.4+ 2.4 nm for truncated cubes, and 13.2±3.0 nm for hexagonal prisms. The truncated cube particles included a variety of smaller sizes (under 12 nm) besides the primary product that were omitted from size measurements.

Figure 1L:
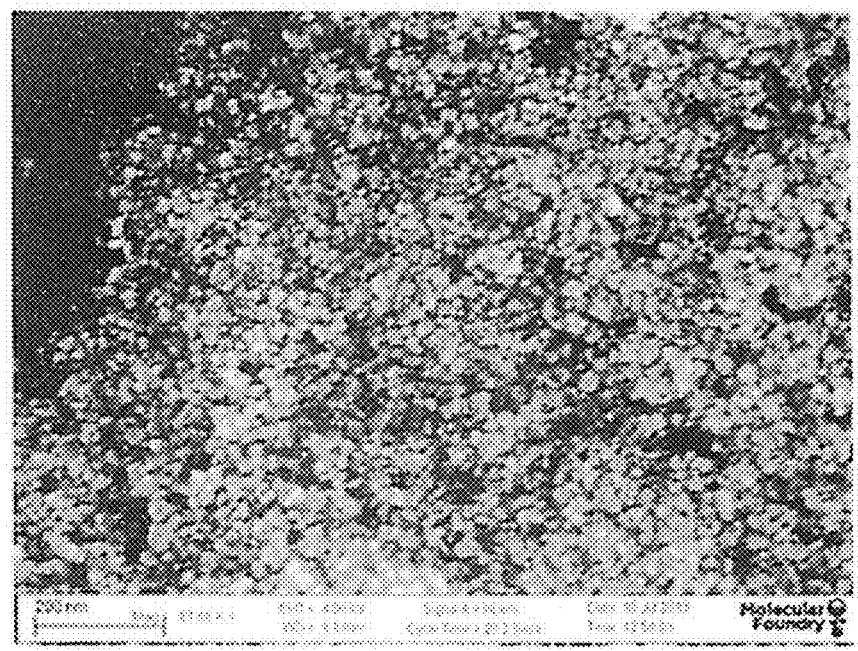
FIG. 1L is a scanning electron microscopy (SEM) image of hexagonal prisms for a sample.

FIG. 1H-1K are size histograms showing data collected from bright field TEM images including 50-100 particles each of undoped $WO_{2.72}$ rods, $Cs_{0.29}WO_3$ hexagonal prisms, $Cs_{0.29}WO_3$ truncated cubes, and $Cs_{0.29}WO_3$ pseudo-spheres, respectively. FIG. 1L is a scanning electron microscopy (SEM) image of $Cs_{0.29}WO_3$ hexagonal prisms.

Figure 2A:
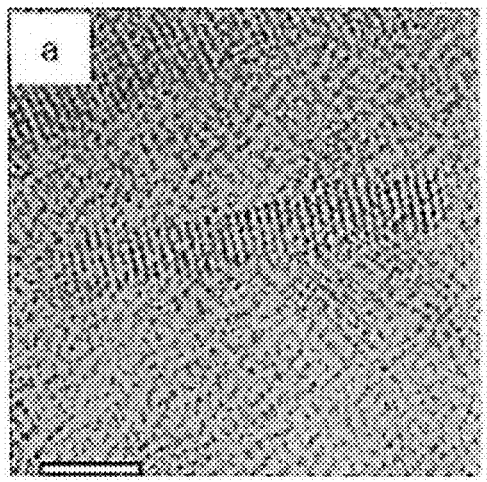
FIGS. 2A-2D are TEM images of different shapes of nanostructures for various samples.
Figure 2B:
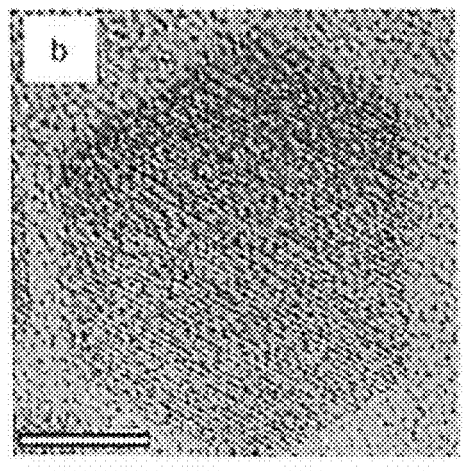
Figure 2C:
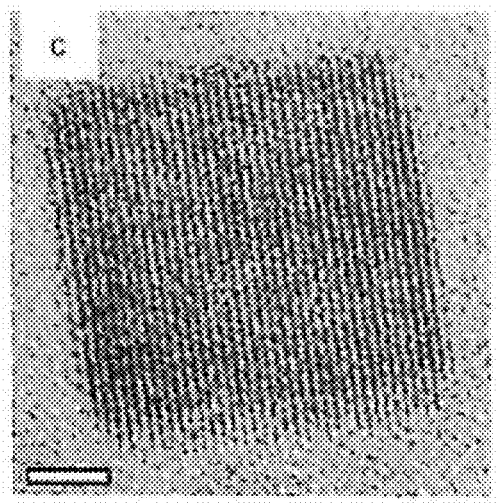
Figure 2D:
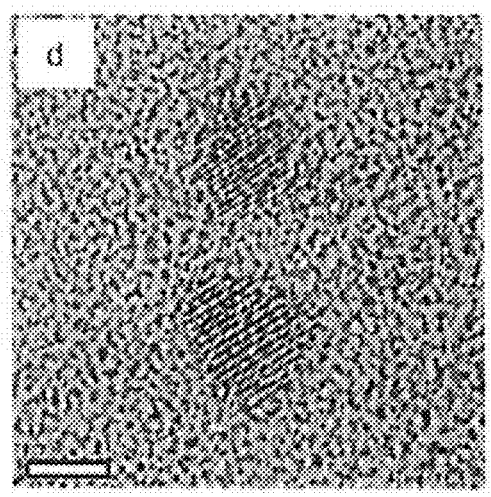

The faceted shapes observed by TEM suggest crystalline particles, and were confirmed to be single crystals by high resolution TEM as shown in FIGS. 2A-2D. FIG. 2A is a high resolution lattice-resolved TEM image of undoped $WO_{2.72}$ rods with a [−2 4 1] zone axis. FIG. 2B is a high resolution lattice-resolved TEM image of a $Cs_{0.29}WO_3$ hexagonal prism viewed perpendicular to its largest face with a [−1 0 1] zone axis. FIG. 2C is a high resolution lattice-resolved TEM image of a truncated cube with a [1 0 0] zone axis. FIG. 2D is a high resolution lattice-resolved TEM image of pseudo-spheres with a [1 0 0] zone axis.

Figure 2E:
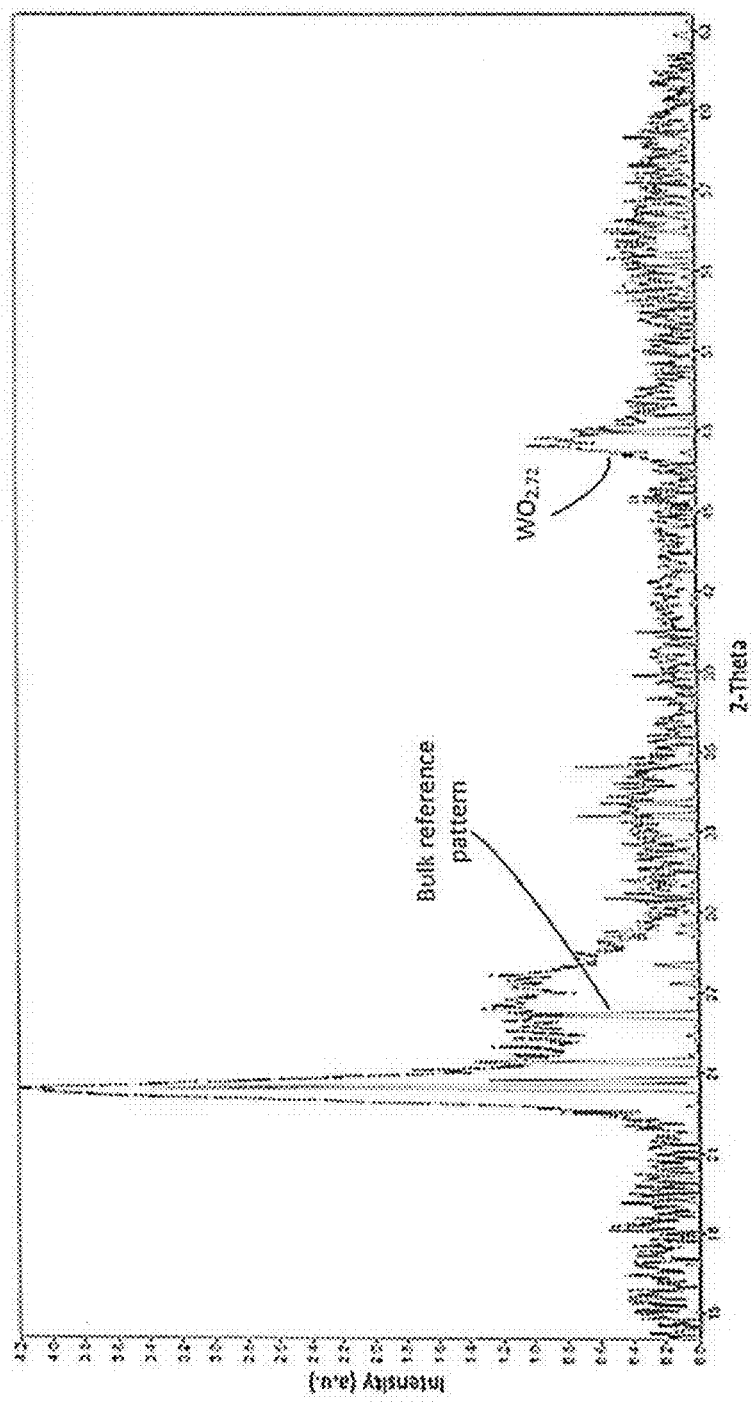
FIG. 2E is a graph showing x-ray diffraction patterns of a sample and of bulk reference pattern data.

FIG. 2E is an XRD pattern for $WO_{2.72}$ compared to a bulk reference pattern (ICSD: 24731). As shown, undoped tungsten oxide is consistent with monoclinic $WO_{2.72}$, supporting the assignment of the composition as $WO_{3-x}$ where x is 0.28. The $WO_{3-x}$ structure is a reduced form of cubic $WO_3$ that contains oxygen vacancies within the crystal lattice. These oxygen vacancies create a distribution of W formal oxidation states between 6+, 5+, and 4+, and the alterations in charge state are responsible for changes in absorption properties compared to $WO_3$. This is apparent by the dark blue color of the nanorods, which results from the tail of the strong infrared spectrum absorption crossing into the red edge of the visible spectrum.

Figure 3A:
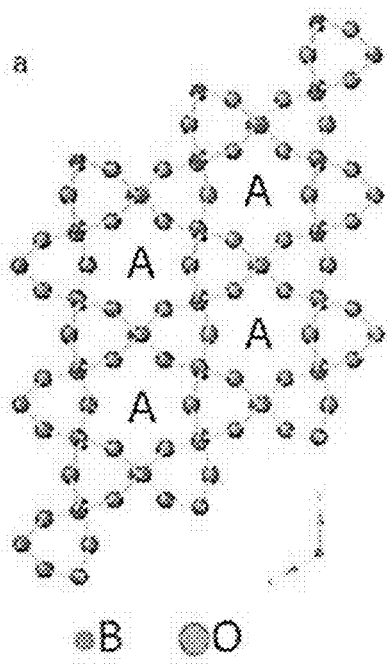
FIG. 3A is a ball-and-stick model crystal structure of a composition in various embodiments.
Figure 3B:
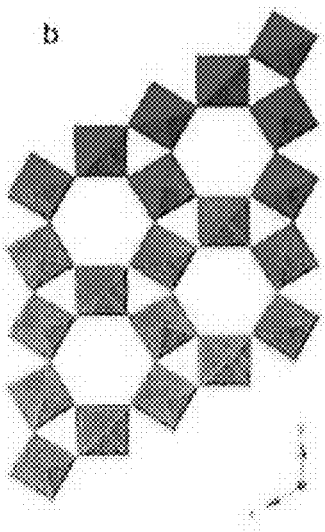
FIGS. 3B-3D are polyhedral models of compositions of the various embodiments.
Figure 3C:
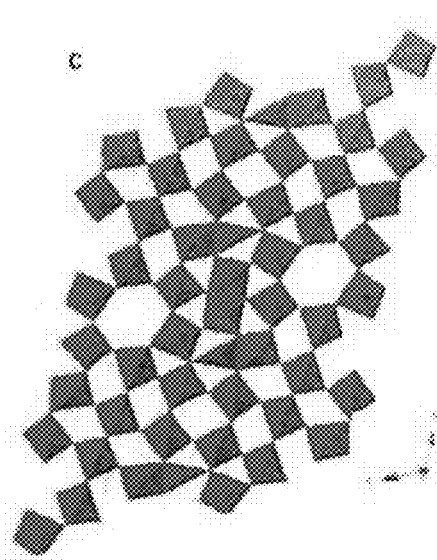
Figure 3D:
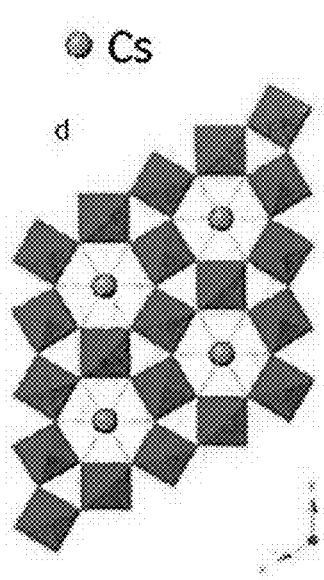

To better understand how NIR spectrum radiation plasmonic characteristics can emerge in interstitially doped tungsten bronze nanocrystals, it is useful to consider the crystallographic implications of doping tungsten oxide. $WO_3$ may be described as a modification of the perovskite-type $ABO_3$ lattice in which the B site is occupied by W atoms and the A site is unoccupied, as shown in FIG. 3A, which is a ball-and-stick model of $WO_3$. Oxygen vacancies within the lattice result in the formation of $WO_6$ octahedron as the basic structural unit. FIG. 3B is a polyhedral model of $WO_3$, which shows that these oxygen vacancies are responsible for creating tunnels within the crystal structure of $WO_{2.72}$. FIG. 3C is a polyhedral model of $WO_{2.72}$ showing that additional oxygen vacancies distort the $WO_6$ octahedral units and the local environments of the tungsten ions become heterogeneous. Doping with $Cs^+$ ions instead results in occupation of the open channels in the $WO_3$ structure to form $Cs_xWO_3$. This is shown in FIG. 3D, which is a polyhedral model of $Cs_xWO_3$.

Figure 3E:
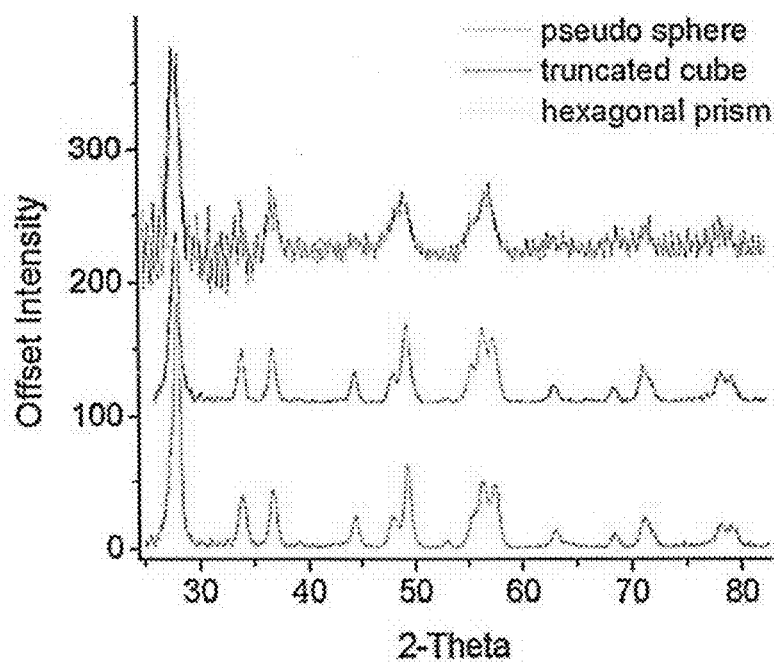
FIGS. 3E-3G are graphs showing normalized x-ray dif- fraction patterns of a sample having various shapes.
Figure 3F:
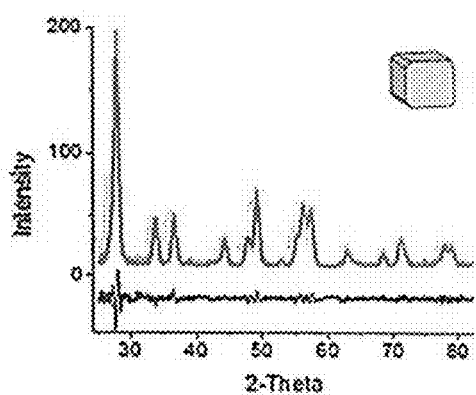
Figure 3G:
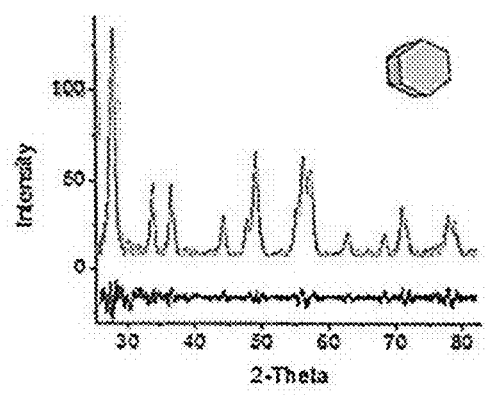

FIG. 3E shows XRD patterns for $Cs_{0.29}WO_3$ spheres, truncated cubes, and hexagonal prisms. The three shapes of cesium tungsten bronze (i.e., hexagonal prism, truncated cube, and pseudo-sphere) were determined by XRD to be $Cs_{0.29}WO_3$, consistent with a $Cs_{0.29}WO_3$ reference pattern. XRD patterns were refined by Le Bail fitting in the GSAS suite for the hexagonal prisms (Rp 0.2091; wRp 0.1101) and truncated cubes (Rp 0.1485; wRp 0.0984). FIG. 3F is a Le Bail fit with residual plot of a 20.4±2.4 nm truncated cubes. FIG. 3G is a Le Bail fit with residual plot of 13.2±3.0 nm hexagonal prisms. The unit cell increases slightly in size when comparing the truncated cube to the hexagonal prism, with respective increases from 7.395 Å to 7.404 Å for the pattern shown in FIGS. 3E and 3F, and 7.606 Å to 7.615 Å for the pattern shown in FIG. 3G.

Though XRD confirms that Cs is incorporated within the crystal structure, further analysis was performed to determine how the Cs ions are distributed throughout the nanocrystals. Specifically, doping near the surface of the nanocrystals of $Cs_{0.29}WO_3$ was characterized by XPS, which is shown in a survey scan in FIG. 3H. FIGS. 3I and 3J are high resolution scans of $Cs_{0.29}WO_3$ showing normalized peak area measurements for tungsten and cesium respectively. The surface composition was dominated by oxygen and carbon, with a metals composition determined to be 18.2% Cs and 81.7% W from the normalized peak area measurements (i.e. x=0.15 in $Cs_xWO_3$). By contrast, the average doping content analysis was determined by Inductively coupled plasma atomic emission spectroscopy (ICP-OES) and flame atomic absorption (FLAA) spectroscopy to be x=0.09. These results suggest that the Cs distribution is radially non-uniform with higher doping levels near the surface of the nanocrystals. FIG. 3K is a table detailing peak fit parameters and composition analysis for $Cs_{0.29}WO_3$.

To investigate whether the NIR spectrum radiation absorbance of synthesized $Cs_xWO_3$ nanocrystals can be ascribed to SPR or to absorption by local defect states, shift in the absorbance peak in solvents of varying refractive index (RI) was observed. The SPR is known to be sensitive to the RI of the surrounding environment, where increasing the RI of the solvent has a linear effect on the wavelength of the plasmon peak. Optical spectra of the same hexagonal prism sample of $Cs_{0.29}WO_3$ were collected in solvents TCE, dimethylformamide (DMF) (Aldrich), and acetonitrile (MeCN), which have respective RIs of 1.51, 1.43, and 1.35.

Figure 4A:
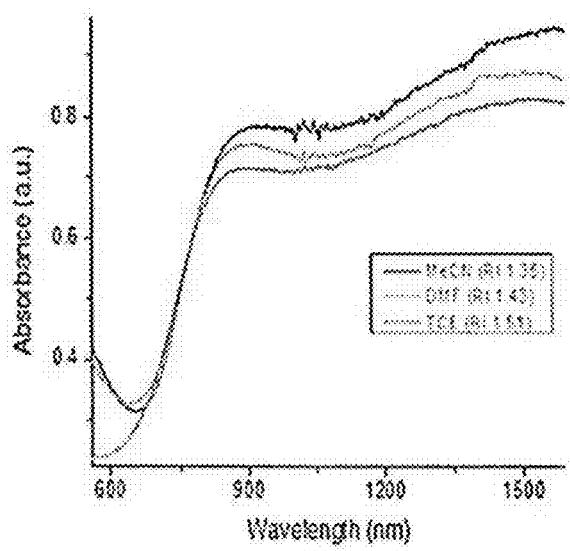
FIGS. 4A-4C are graphs showing absorbance spectra of hexagonal prism $Cs_{0.29}WO_3$ in solvents of varying refractive indexes.
Figure 4B:
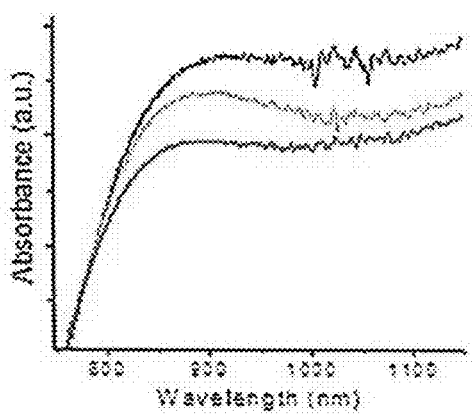
Figure 4C:
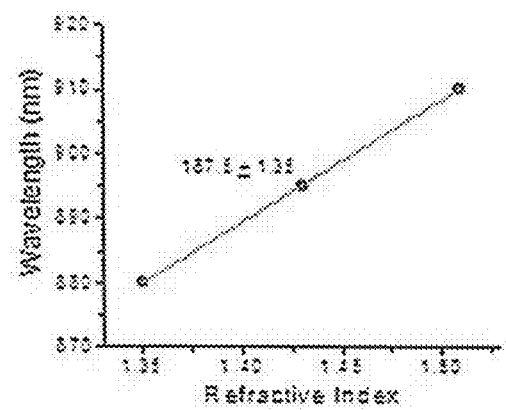

FIG. 4A illustrates the absorbance spectra of the hexagonal prism $Cs_{0.29}WO_3$ in these solvents, showing two distinct absorbance peaks. While the longer wavelength peak is too broad to draw any definitive conclusions as to the peak shift, the there is an obvious red-shift in the shorter wavelength peak as RI changes. FIG. 4B is a magnification of the shorter wavelength absorbance peak for the hexagonal prism $Cs_{0.29}WO_3$ in TCE, DMF and MeCN. FIG. 4C is a plot showing solvent RI versus wavelength for the hexagonal prism $Cs_{0.29}WO_3$. The data show an obvious and systematic shift of the peak position to longer wavelengths as the RI of the solvent increases, which supports the assignment of this shorter wavelength peak as plasmon resonance absorption though it remains to be definitively ascertained whether the longer wavelength peak is also plasmonic in nature. Mie's solution to Maxwell's equation predicts a stronger dependence of the peak wavelength on RI than was observed experimentally. The effect of refractive index (RI) of the host medium on SPR peak position for a nano-sized particle, from the Mie theory, can be expressed as:

$$C_{ext} = \frac{4\pi}{k^2} Re\left(i\left(\frac{\varepsilon - \varepsilon_{med}}{\varepsilon + 2\varepsilon_{med}}\right)\right), \quad (Eq. 1)$$

where $C_{ext}$ represents extinction cross section of a spherical particle, k is $2\pi n_{med}/\lambda$ (where $n_{med}$ represents refractive index of medium), $\in$ represents particle dielectric function, and $\in_{med}$ represents dielectric function of medium. From Equation 1, $$Re(\in + 2\in_{med}) \rightarrow 0 \quad (Eq. 2).$$

For a spherical particle, from the free electron Drude model, $$Re(\varepsilon) = 1 - \frac{\omega_p^2}{\omega^2 + \gamma^2}, \quad (Eq. 3)$$

where $\omega_p$ represents the plasmon frequency of the bulk metal, $\omega$ represents frequency of incident light and $\gamma$ represents damping frequency of bulk material.

Since the peak frequencies in the examples herein lie in the visible spectrum range, $\omega \gg \gamma$, equation 3 can be simplified to:

$$Re(\varepsilon) = 1 - \frac{\omega_p^2}{\omega^2}. \quad (Eq. 4)$$

Substituting Equation 1 into Equation 4 provides $$\omega = \frac{\omega_p}{\sqrt{2\varepsilon_{med} + 1}}. \quad (Eq. 5)$$

Substituting $\in_{med} = \eta_{med}^2$, and within a small range of RI, Equation 5 simplifies to $$\lambda = \sqrt{2}\lambda_p \eta \quad (Eq. 6),$$

where $\lambda$ represents peak wavelength, $\lambda_p$ represents bulk plasmon wavelength and $\eta$ represents refractive index. As shown by Equation 6, for nano-sized spherical particle within a small range of RI, peak wavelength is linearly dependent on RI of the medium.

Figure 4D:
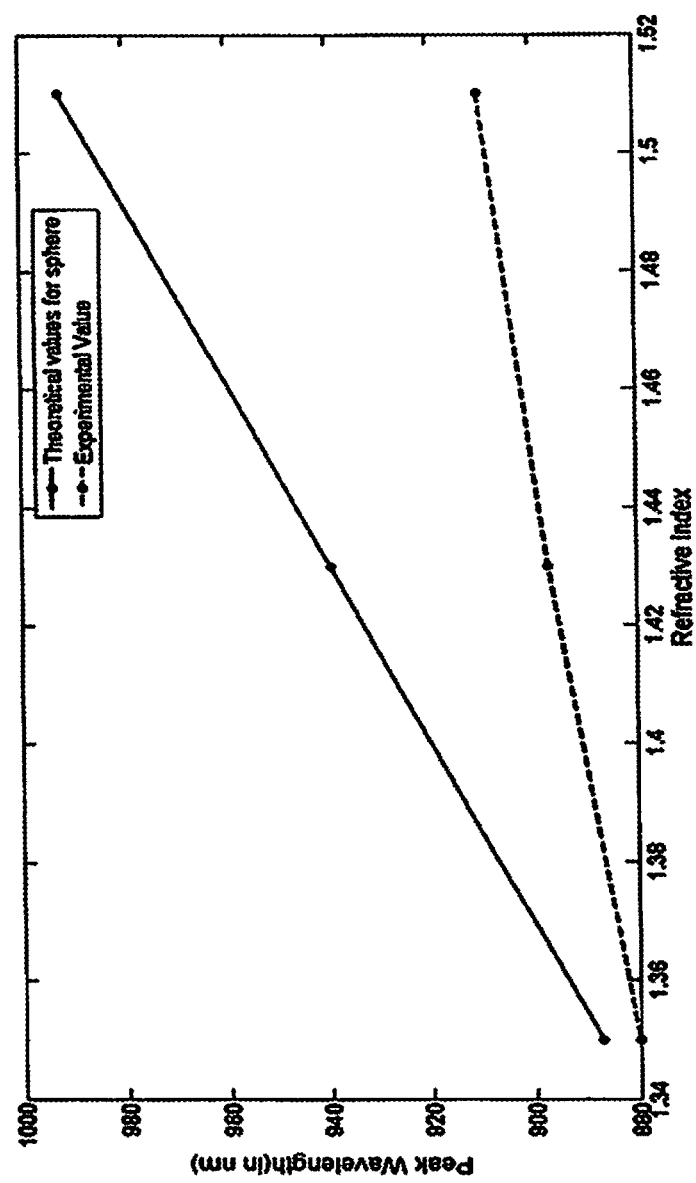
FIG. 4D is a plot showing experimental data and theo- retical predictions for SPR peak position versus refractive index of spherical nanoparticles.

FIG. 4D shows SPR peak position of experimental data and the theoretical prediction using Mie's solution to Maxwell's equation plotted against the RI of the surround medium (theory) or solvent (experiment). The data show that Mie's solution to Maxwell's equation predicts a stronger dependence of the peak wavelength on RI than was observed experimentally. This difference can be ascribed to the non-spherical shape of the particles as well as the contribution of the ligands attached to the surface of the nanocrystals.

The connection between SPR and particle shape has been well studied for metal nanoparticles. For example, a wide range of gold nanoparticle shapes have been studied, including stars, dumbbells, and triangular and hexagonal plates. The influence of shape on SPR has also been studied in silver octahedra, rods, triangles, and plates. Recently, the possibility for doped semiconductor nanocrystals to exhibit shape-dependent plasmonic properties has been investigated. Results for vacancy-doped copper chalcogenide nanocrystals are conflicting. $Cu_{2-x}S$ is known to have tunable plasmons, and changing the aspect ratio of semiconductor $Cu_{2-x}S$ nanodiscs has a strong influence on the NIR spectrum absorption. By contrast, Kriegel et. al. found that the SPR of $Cu_{2-x}Te$ nanospheres, rods, and tetrapods have only a weak shape dependence (see L. Kriegel et al., *ACS Nano* 2013, 7, 4367-4377).

Changing the aspect ratio of phosphorous-doped silicon nanowires was also reported to yield a shape-dependent SPR. In the case of substitutionally-doped metal oxides, Gordon et. al. have recently published clear evidence of shape dependent SPR in indium-doped cadmium oxide spheres and octahedral (see T. R. Gordon et al., *Nano Lett.* 2013, 13, 2857-2863).

Noguez discusses SPRs for a series of silver nanoparticle shapes, explaining how the optical peaks change when increasing the number of truncations of a cube (see C. Noguez, *J. Phys. Chem C.*, 2007, 111, 3806-3819). That is, truncating a cube results in shapes with different numbers of planes or faces; cube (6 faces), truncated cube (14 faces), icosohedron (20 faces), and sphere (infinite faces). As the number of faces on the particle increases, three important trends are apparent in the resonance spectra. First, the main/largest resonance will blue-shift. Second, the peaks with smaller wavelength resonances move closer to the main resonance and can be hidden. Third, the width of the main resonance peak increases.

Figure 5A:
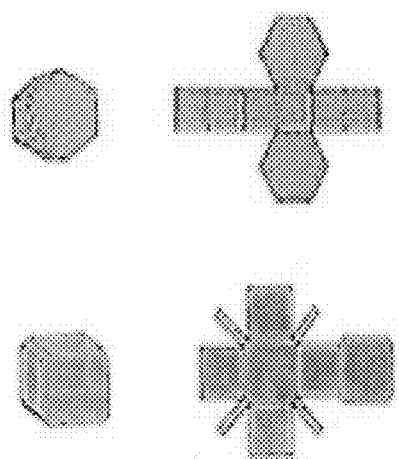
FIG. 5A is an illustration of different faceted shapes of nanocrystals and their flat projections that may exist in the various embodiments.

Trends in optical spectra of $Cs_xWO_3$ nanocrystals were observed by analogous deconstruction of their idealized shapes into the number of faces. The nanocrystals described herein exhibit the same three trends that Noguez identified for silver nanoparticles, highlighting the similarity of physics between metals and doped semiconductors when looking at plasmons. FIG. 5A shows flat projections of a hexagonal prism and truncated cube, with eight and ten faces respectively (a sphere has an infinite number of faces so is not depicted).

Figure 5B:
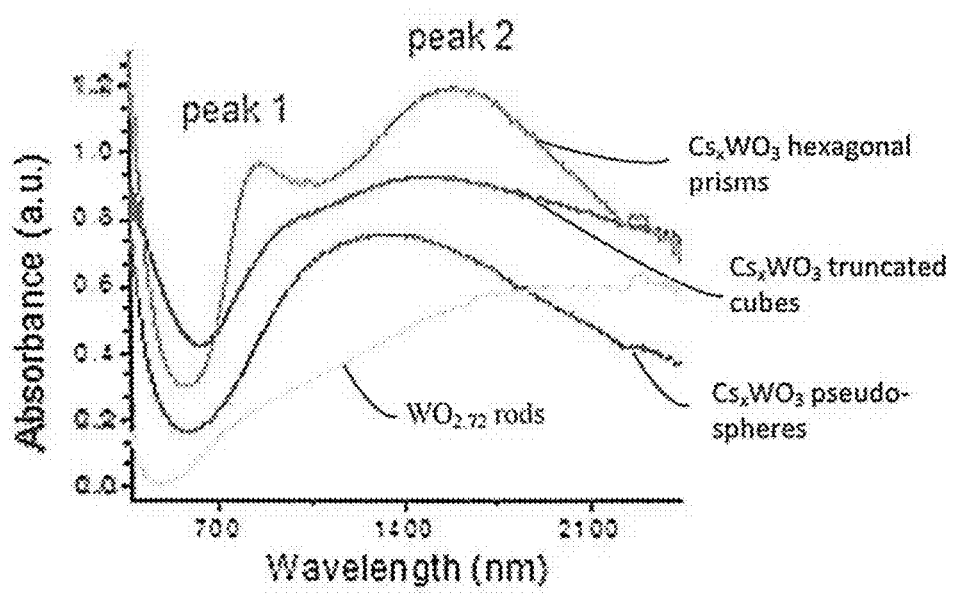
FIG. 5B is a graph showing absorbance spectra for samples having different shapes in the various embodiments.

FIG. 5B shows the absorbance spectra of $Cs_xWO_3$ hexagonal prisms (top line), truncated cubes (second from top line), pseudo-spheres (second from bottom line), and $WO_{2.72}$ rods (bottom line), with spectra offset for clarity.

The hexagonal prism has two distinct absorbance peaks, a less intense peak at 860 nm (peak 1) and a more intense peak at 1602 nm (peak 2). As the number of faces on the nanocrystal surface increases from eight (hexagonal prism) to ten (truncated cube) to infinity (sphere), the optical peaks reduce from two obvious, distinct peaks to one. This is observed as the number of faces increase with a red-shift of peak 1 (respectively 860 nm, 990 nm, 1315 nm) and a blue-shift of peak 2 (respectively 1602 nm, 1506 nm, and 1315 nm). As the trend of increasing the faces of the particles progresses, peak 1 becomes less visible. In effect, peak 1 in the pseudo-sphere sample becomes indistinguishable from peak 2, so that both resonances occur under the envelope of one broader peak.

These shape dependent absorption spectra are compared to the spectra of $WO_{2.72}$ nanorods in FIG. 5B. The defect structure of oxygen-vacancy doped tungsten oxide creates strong electron-phonon interactions which activate polarons en absorb visible spectrum and NIR spectrum radiation. FIG. 5B shows the absorbance spectra of $WO_{2.72}$ with a broad peak at approximately 2100 nm. This spectrum is sharply contrasted with those that result from doping with cesium, which changes the crystal structure from monoclinic to hexagonal. Adachi has suggested that peak 2 in $Cs_xWO_3$ is a shift of the polaron seen in $WO_{2.72}$ (see K. Adachi et al., *J. Mater. Res.* 2012, 27, 965-970).

However, given the change in crystal structure and increase in carrier density in $Cs_xWO_3$, it is possible that both NIR spectrum radiation absorption peaks in $Cs_xWO_3$ are a result of the SPR of free electrons in the conduction band. Indeed, the carrier concentration in the interstitially doped $Cs_xWO_3$ nanocrystals appears to be substantially higher than is observed in the literature on plasmonic semiconductor nanocrystals. Commonly studied plasmonic metals such as silver, gold, and copper have carrier densities in the range of $1022$-$1023$ $cm^{-3}$. Doped plasmonic materials have substantially lower carrier densities, such as $Cu_{1.85}Se$ with a carrier density of $3.0 \times 1021$ $cm^{-3}$ and indium tin oxide with a density of $1.9 \times 1021$ $cm^{-3}$. The carrier density for the synthesized faceted $Cs_xWO_3$ particles cannot be rigorously derived from their optical spectra without detailed electromagnetic modeling, but it was approximated by Drude theory to be as high as $5 \times 1021$ $cm^{-3}$.

Figure 6A:
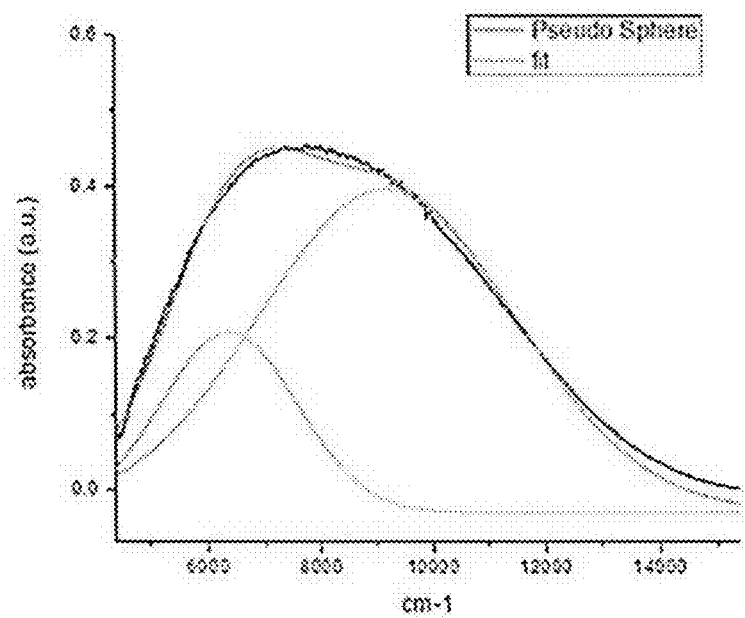
FIG. 6A is a graph showing absorbance spectra for peak fit of pseudo-sphere absorbance spectra including calculated parameters, statistics, and calculated carrier density.
Figure 6B:
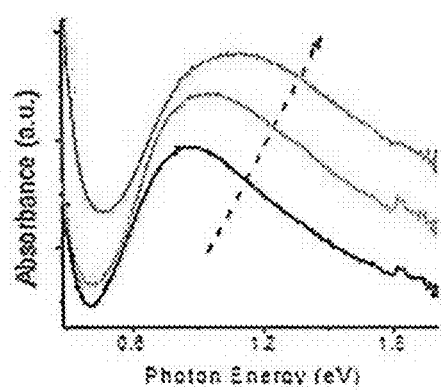
FIGS. 6B-6C are absorbance spectra of progressing reac- tions for samples having different shapes in the various embodiments.
Figure 6C:
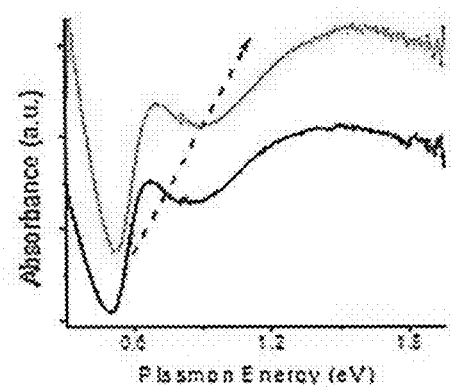

FIG. 6A illustrates Gaussian peak fit of pseudo sphere absorbance spectra including calculated parameters, statistics, and calculated carrier density. FIG. 6B shows the absorbance spectra of a $Cs_xWO_3$ pseudo-sphere sample, with aliquots of the same reaction taken at 5 mins (bottom line), 30 mins (middle line), and 60 mins (top line). As the reaction progresses the particle size increases from roughly 3 nm to 5 nm, and there is an obvious red-shift of the resonance peak from 1081 nm at 5 min to 1350 nm at 60 min. FIG. 6C shows the absorbance spectra of a $Cs_xWO_3$ hexagonal prism sample, with aliquots of the same reaction taken at 30 mins (bottom line) and 90 mins (top line). As the reaction progresses from 30 min to 90 min the plasmon peaks shift from 835 nm to 870 nm and 1840 m to 1962 nm. These shifts in spectra follow the same qualitative trends reported in the literature for 5-40 nm gold rods (with fixed 2.4 aspect ratio), and 9-99 nm gold spheres.

The high selectivity of the $WO_3$ tunnels for species with a 1.7 Å size make them ideal for the incorporation of 1.69 Å $Cs^+$ ions. Doping tungsten oxide with cesium drives the crystal structure to shift from monoclinic to hexagonal, and the free electrons introduced within the system create plasmon peaks in the optical spectra. The high concentration of free electrons yields SPR peaks at far higher energy than those achievable by substitutional doping of metal oxides. Though the broadness of peak 2 makes its assignment as a plasmon inconclusive, the obvious shift of peak 1 in response to changes in solvent RI support its assignment as a plasmon.

The existing literature does not explain the expected connection between particle shape and resonance properties in interstitially-doped semiconductor nanocrystals. Controlling nanocrystal geometry, size, and dielectric environment are preferred parameters for systematically manipulating optical properties, and the foregoing results confirm that all three of these parameters influence SPR properties in tungsten bronze materials. The synthesis of hexagonal $Cs_xWO_3$ as hexagonal prisms, truncated cubes, and pseudo-spheres demonstrates how increasing the number of faces on a nanocrystalline tungsten oxide surface causes the SPR peaks to shift toward one another, eventually becoming one peak.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic device comprising:
   at least one transparent conductor layer;
   a nanostructured transition metal oxide bronze layer comprising:
      one or more transition metal oxide;
      a dopant species that causes a surface plasmon resonance effect on the one or more transition metal oxide by creating delocalized electron carriers that selectively modulate transmittance in response to a first applied voltage to the device; and
      an intercalation species that causes a change in the oxidation state of transition metal ions in the transition metal oxide due to intercalation into and deintercalation from the metal oxide, which selectively modulates transmittance in response to a second applied voltage to the device, the second applied voltage having a larger absolute value than the first applied voltage;
   a solid state electrolyte; and
   a counter electrode;
   wherein the nanostructured transition metal oxide bronze independently, selectively modulates transmittance of near-infrared (NIR) spectrum radiation and visible spectrum radiation as a function of the first and the second applied voltage to the device.

2. The electrochromic device of claim 1, wherein the dopant species that cause the surface plasmon resonance effect on the one or more transition metal oxide by creating delocalized electron carriers selectively modulate the transmittance of the NIR spectrum radiation in response to the first applied voltage to the device.

3. The electrochromic device of claim 2, wherein the intercalation species causes the change in the oxidation state of transition metal ions in the transition metal oxide due to intercalation into and deintercalation from the metal oxide which selectively modulates the transmittance of the visible spectrum radiation in response to the second applied voltage to the device.

4. The electrochromic device of claim 1, wherein the dopant species that causes the surface plasmon resonance effect comprises at least one of cesium, cerium, lanthanum, praseodymium, neodymium, promethium, samarium, europium, gadolinium, terbium, dysprosium, holmium, erbium, thulium, ytterbium, lutetium, and rubidium ions.

5. The electrochromic device of claim 1, wherein:
   the intercalation species migrates between the solid state electrolyte and the nanostructured transition metal oxide bronze layer; and
   the intercalation species comprises at least one of:
   lithium, sodium, potassium, rubidium, cesium, beryllium, magnesium, calcium, strontium, or barium ions;
   cerium, lanthanum, praseodymium, neodymium, promethium, samarium, europium, gadolinium, terbium, dysprosium, holmium, erbium, thulium, ytterbium, or lutetium ions; and
   a charged proton species.

6. The electrochromic device of claim 1, wherein:
   the nanostructured transition metal oxide bronze layer comprises a plurality of nanoparticles; and
   the solid state electrolyte is a material comprising at least a polymer, a lithium salt, and a plasticizer, wherein the solid state electrolyte material permeates into crevices between the nanoparticles of the nanostructured transition metal oxide bronze layer.

7. The electrochromic device of claim 6, wherein the solid state electrolyte material comprises 40-60 wt % of the plasticizer, wherein the polymer comprises polyvinylbutyral (PVB), and wherein the lithium salt comprises lithium bis(trifluoromethane).

8. The electrochromic device of claim 1, wherein the solid state electrolyte comprises lithium phosphorus oxynitride (UPON) or $Ta_2O_5$.

9. The electrochromic device of claim 1, wherein the one or more transition metal oxide comprises at least one of niobium, tungsten, molybdenum, vanadium, and titanium oxide.

10. The electrochromic device of claim 9, wherein the counter electrode comprises a passive electrode material selected from $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, and $V_2O_5$, or a complementary electrode material selected from $Cr_2O3$, $MnO_2$, $FeO_2$, $CoO_2$, $NiO_2$, $RhO_2$, and $IrO_2$.

11. The electrochromic device of claim 9, wherein the intercalation species is selected from a group comprising at least one of:
   lithium, sodium, potassium, rubidium, cesium, calcium, beryllium, magnesium, calcium, strontium, or barium ions;
   cerium, lanthanum, praseodymium, neodymium, promethium, samarium, europium, gadolinium, terbium, dysprosium, holmium, erbium, thulium, ytterbium, or lutetium, ions; and
   a charged proton species.

12. The electrochromic device of claim 11, wherein at least one of the one or more transition metal oxide comprises tungsten oxide ($WO_{3-x}$), where $0 \leq x \leq 0.1$, and wherein at least one of the one or more dopant species comprises cesium ions.

13. The electrochromic device of claim 11, wherein the nanostructured transition metal oxide bronze layer comprises $Nb:TiO_2$.

14. The electrochromic device of claim 1, wherein the nanostructured transition metal oxide bronze layer comprises nanoparticles having a plurality of facets.

15. The electrochromic device of claim 14, wherein the nanoparticles comprise isohedrons having at least 20 facets.

16. The electrochromic device of claim 1, wherein the first and the second applied voltage is between −5V and 5V.

17. The electrochromic device of claim 16, wherein the first and the second applied voltage is between −2V and 2V.

18. The electrochromic device of claim 16, wherein the first applied voltage comprises a negative bias, and wherein the nanostructured transition metal oxide bronze layer absorbs NIR spectrum radiation and is transparent to visible spectrum radiation.

19. The electrochromic device of claim 18, wherein increasing the applied negative bias voltage causes the nanostructured transition metal oxide bronze layer to absorb visible spectrum radiation and NIR spectrum radiation.

20. The electrochromic device of claim 16, wherein the second applied voltage comprises a positive bias, and wherein the nanostructured transition metal oxide bronze layer is transparent to NIR spectrum radiation and visible spectrum radiation.

* * * * *